(12) United States Patent
He

(10) Patent No.: US 9,268,381 B2
(45) Date of Patent: Feb. 23, 2016

(54) TERMINAL DEVICE AND POWER SUPPLY METHOD FOR TERMINAL DEVICE

(71) Applicant: Huawei Device Co., Ltd., Shenzhen (CN)

(72) Inventor: Qingjian He, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 411 days.

(21) Appl. No.: 13/827,739

(22) Filed: Mar. 14, 2013

(65) Prior Publication Data
US 2013/0275779 A1    Oct. 17, 2013

(30) Foreign Application Priority Data

Apr. 9, 2012    (CN) .......................... 2012 1 0101746

(51) Int. Cl.
*G06F 1/26* (2006.01)
(52) U.S. Cl.
CPC . *G06F 1/26* (2013.01); *G06F 1/266* (2013.01)
(58) Field of Classification Search
CPC ........... G06F 1/3206; G06F 1/26; G06F 3/04; G06F 13/409
See application file for complete search history.

(56) References Cited

U.S. PATENT DOCUMENTS

| 2008/0126592 | A1 | 5/2008 | Townsend |
| 2009/0125732 | A1* | 5/2009 | Oya et al. ...................... 713/300 |
| 2010/0083012 | A1* | 4/2010 | Corbridge et al. ............ 713/300 |
| 2010/0109602 | A1 | 5/2010 | Chang |
| 2011/0018356 | A1* | 1/2011 | Chatterjee .................... 307/104 |
| 2011/0055407 | A1 | 3/2011 | Lydon et al. |
| 2012/0030381 | A1* | 2/2012 | Singh et al. ...................... 710/16 |
| 2012/0198101 | A1* | 8/2012 | Porcella et al. ................ 710/12 |
| 2013/0060971 | A1 | 3/2013 | Kim |
| 2013/0290746 | A1* | 10/2013 | Lee et al. ...................... 713/300 |

FOREIGN PATENT DOCUMENTS

| CN | 101728850 A | 6/2010 |
| CN | 101739375 A | 6/2010 |
| CN | 101901201 A | 12/2010 |
| CN | 102662898 A | 9/2012 |
| CN | 102684270 A | 9/2012 |
| EP | 2290554 A1 | 3/2011 |
| JP | 2004-287887 | 10/2004 |
| WO | WO 2011/028388 A1 | 3/2011 |

OTHER PUBLICATIONS

Anonymous, "Dynamically multiplexing USB_ID pin on a standard USB interface as an input/out pin for detecting external devices as well as charging batteries in a handheld device-like digital camera" Research Disclosure, Mason Publications, Hampshire, GB, vol. 515, No. 65, Mar. 1, 2007, p. 313.

* cited by examiner

*Primary Examiner* — Mohammed Rehman
*Assistant Examiner* — Alyaa T Mazyad
(74) *Attorney, Agent, or Firm* — Brinks Gilson & Lione

(57) ABSTRACT

The present invention is applicable to the interface field, and in particular, relates to a power supply method for a terminal device, where the terminal device is communicatively connected to an accessory device. The method includes: detecting, by the terminal device, an ID resistance value of the accessory device; identifying a type of the accessory device according to the detected ID resistance value; selecting a power supply mode of the terminal device according to the identified type of the accessory device; and supplying power according to the selected power supply mode. In this way, the power input or output of the terminal device is free from the restriction of an OTG working mode of the terminal device.

20 Claims, 3 Drawing Sheets

TERMINAL DEVICE AND POWER SUPPLY METHOD FOR TERMINAL DEVICE

CROSS-REFERENCE TO RELATED APPLICATION

This application claims priority to Chinese Patent Application No. 201210101746.2, filed on Apr. 9, 2012, which is hereby incorporated by reference in its entirety.

FIELD OF THE INVENTION

The present invention relates to the interface field, and in particular, relates to a terminal device and a power supply method for the terminal device.

BACKGROUND OF THE INVENTION

In designing a product, a USB (Universal Serial BUS, universal serial bus) interface of a terminal device is usually used to connect to accessories to extend functions. USB OTG (On-The-Go) is a main outbound communication interface of an internal processor of the terminal device. With respect to implementation, the USB OTG automatically switches between a host (master device) working mode and a device (slave device) working mode by using a USB interface ID (Identity, identity) signal level. When the ID signal has a low level, the OTG working mode of the terminal device is set to a host mode. In this case, 5 V power needs to be output to an external accessory through a VBUS (USB voltage line) power supply of the terminal device; or, when an ID signal is floating or has a high level and the OTG working mode of the terminal device is set to a Device mode, the VBUS power supply of the terminal device needs to input power from the outside for the purposes of charging a battery of the terminal device and powering the system.

In the process of implementing the present invention, the inventor finds that the prior art has at least the following disadvantages: In the solution described above, the power output needs to be bound to the host mode; or, the power input needs to be bound to the Device mode. That is, in the existing implementing solution, the power input or output of a terminal device is restricted by the OTG working mode binding of the terminal device.

SUMMARY OF THE INVENTION

The present invention is implemented as follows: A power supply method for a terminal device is provided, where the terminal device is communicatively connected to an accessory device. The method includes: detecting, by the terminal device, an ID resistance value of the accessory device; identifying a type of the accessory device according to the detected ID resistance value; selecting a power supply mode of the terminal device according to the identified type of the accessory device; and supplying power according to the selected power supply mode.

Another objective of the present invention is to provide a terminal device, where the terminal device is communicatively connected to an accessory device and includes: an interface detecting module, configured to detect an ID resistance value of the accessory device;

a processor module, configured to identify a type of the accessory device according to the detected ID resistance value, and select a power supply mode of the terminal device according to the identified type of the accessory device; and a power supply switching module, configured to switch a power supply of the terminal device according to the selected power supply mode.

With the technical solutions provided by the present invention, after a type of an accessory device is identified by obtaining an ID resistance value of the accessory device, because a power supply mode of the terminal device is selected according to the identified type of the accessory device, the selection of the power supply mode of the terminal device is free from the restriction of working mode binding of the USB OTG.

DETAILED DESCRIPTION OF THE EMBODIMENTS

To make the objectives, technical solutions, and advantages of the present invention more comprehensible, the following further describes the present invention in detail with reference to the accompanying drawings and embodiments. It is understandable that the specific embodiments described herein are only used to explain the present invention and are not intended to limit the present invention.

Figure 1:
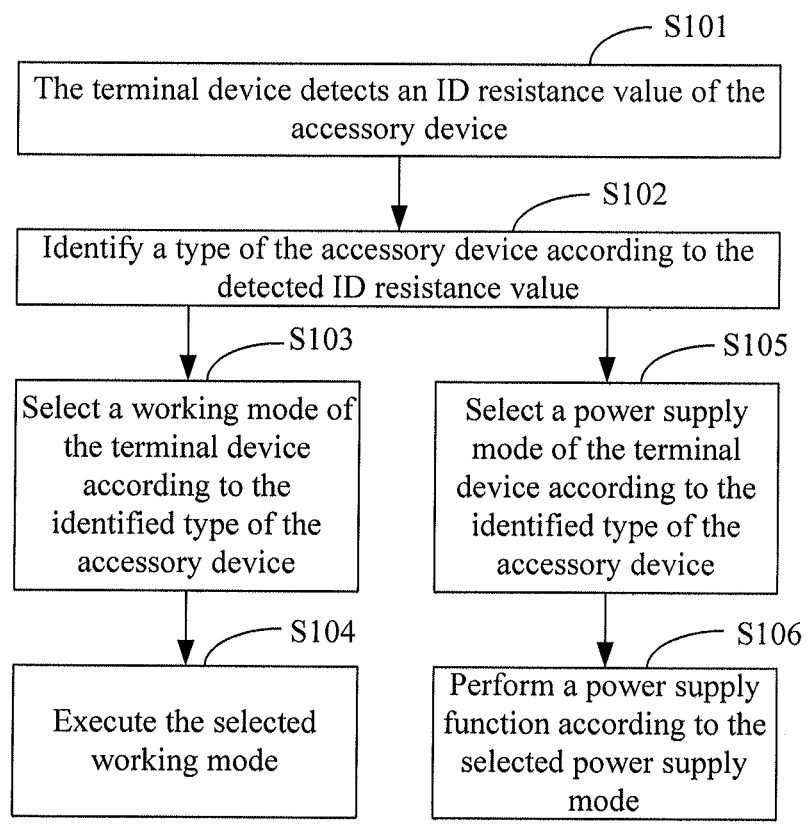
FIG. 1 is a flowchart of a power supply method for a terminal device with an OTG interface according to an embodiment of the present invention.

FIG. 1 shows a process of a power supply method for a terminal device according to an embodiment of the present invention. For ease of description, only a part related to the embodiment of the present invention is illustrated, and a detailed description is given below:

In this embodiment, the terminal device is connected to an accessory device; in this embodiment, the terminal device may be communicatively connected to the accessory device through a USB OTG of a processor in the terminal device.

Step S101: The terminal device detects an ID resistance value of the accessory device.

Step S102: Identify a type of the accessory device according to the detected ID resistance value. In this embodiment, the terminal device identifies the type of the accessory device according to a preset table of mapping between the ID resistance value of the accessory device and the type of the accessory device. In this embodiment, the type of the accessory device may include, without being limited to, an external keyboard, a VGA device, an HDMI device, an external USB device, a mobile phone, and a personal computer.

In this embodiment, the mapping table may be represented in the form of a configuration file. Examples may be given herein, but shall not limit the scope of the present invention. For example, if the ID resistance value of the accessory device is about 120K, the type of the accessory device may be an external keyboard; if the ID resistance value of the accessory device is about 150K, the type of the accessory device may be a VGA device; if the ID resistance value of the accessory device is about 620K, the type of the accessory device may be an HDMI device; and if the ID resistance value of the accessory device is about 300K, the type of the accessory device may be an external USB device. The ID resistance value may be changed as required in practice. For example, if the accessory device is a mobile phone or personal computer, the ID resistance value may be changed and then configured into a corresponding configuration file.

Step S103: Select a working mode of the terminal device according to the identified type of the accessory device. In this embodiment, working modes include a Host mode and a Device mode. In this embodiment, the terminal device may be communicatively connected to the accessory device through the USB OTG of a processor in the terminal device. The working mode of the terminal device refers to the working mode of the USB OTG of the processor.

In this embodiment, a working mode corresponding to the type of the accessory device in a preset working mode configuration file may be queried for according to the identified type of the accessory device, and the found working mode may be used as the working mode of the USB OTG.

In this embodiment, the type of the accessory device may include, without being limited to, an external keyboard, a VGA device, an HDMI device, an external USB device, a mobile phone, and a personal computer. Therefore, in the preset working mode configuration file, a working mode is available for each type of accessory device. For example, when the type of the accessory device is an external keyboard, or a VGA device, or an HDMI device, or an external USB device, the working mode of the USB OTG is a Host mode; when the type of the accessory device is a mobile phone or a personal computer, the working mode of the USB OTG is a Device mode.

Step S104: Execute the selected working mode. In this embodiment, if a Host mode is selected as the working mode, the USB OTG of the terminal device is controlled to be in a Host mode; if a Device mode is selected as the working mode, the USB OTG of the terminal device is controlled to be in a Device mode.

In this embodiment, no matter which working mode is selected in step S103, step S105 may be performed at the same time to select a power supply mode of the terminal device according to the identified type of the accessory device.

In this embodiment, the selection of a power supply mode of the terminal device may be to select whether to use the terminal device to power the accessory device or to use the accessory device to power the terminal device, where "the accessory device supplies power to the terminal device" may also be understood as "the accessory device charges the terminal device".

In this embodiment, the power supply mode may be selected according to a power supply policy of the identified type of the accessory device. The power supply policy may include, without being limited to: selecting a power supply mode by querying a preset power supply configuration file corresponding to the type of the accessory device; or, selecting a power supply mode of the terminal device according to a currently set by a user; or, selecting a power supply mode according to a power output status of the accessory device.

In this embodiment, the power supply policy that selects a power supply mode by querying the preset power supply configuration file is described: Two configuration files may be configured for each type of accessory device, where the first configuration file serves a purpose of using the terminal device to power the accessory device, and the second configuration file serves a purpose of using the accessory device to power the terminal device. In this embodiment, one configuration file in the accessory device may be selected randomly or preferentially as a current power supply policy to select a power supply mode, and then a determination is made as to whether the selected configuration file runs successfully; if the running succeeds, it indicates that it is appropriate to use the configuration file to select a power supply mode; if the running fails, the other configuration file in the accessory device is selected as a current power supply policy to select a power supply mode. For example, when the accessory device is an external keyboard, the power supply policy of the external keyboard may be: using the terminal device to power the external keyboard, or using the external keyboard to power the terminal device. In this embodiment, the external keyboard may be selected to be used to power the terminal device first; if the running fails, the terminal device is selected to be used to power the external keyboard.

In this embodiment, the power supply policy that applies the power supply mode of the terminal device currently set by the user is described: After the type of the accessory device is identified, a message is sent to prompt the user to set a power supply mode for the terminal device. After the user finishes the setting according to the type of the accessory device, power is supplied according to the power supply mode of the terminal device currently set by the user. For example, when the accessory device is an external keyboard, a display screen (not illustrated) displays the message to prompt the user to set a power supply mode for the terminal device, and the power supply mode set by the user is received and executed.

In this embodiment, the power supply policy that selects a power supply mode according to a power output status of the accessory device is described: Whether power is output from the current accessory device is detected; and if no power output from the current accessory device is detected, it is determined that the power output status of the current accessory device is zero output; or, if power output from the current accessory device is detected, it is determined that the power output status of the current accessory device is active output. For example, when the accessory device is an external keyboard, if no power output from the external keyboard is detected, it is appropriate to select to use the terminal device to power the accessory device.

If the power output status of the current accessory device is zero output, the terminal device is selected to be used to power the accessory device; or, if the power output status of the current accessory device is active output, the accessory device is selected to be used to power the terminal device.

Step S106: Perform a power supply function according to the selected power supply mode.

With the technical solutions provided by the present invention, an ID resistance value of an accessory device is obtained and a type of the accessory device is identified; because a working mode of the USB OTG and a power supply mode of the terminal device are selected according to the identified type of the accessory device, the selection of the power supply mode of the terminal device is free from the restriction of working mode binding of the USB OTG, the impact caused by the binding between the power supply mode of the terminal device and the working mode of the USB OTG is reduced, and the application scope of the power supply for the terminal device is widened.

Figure 2:
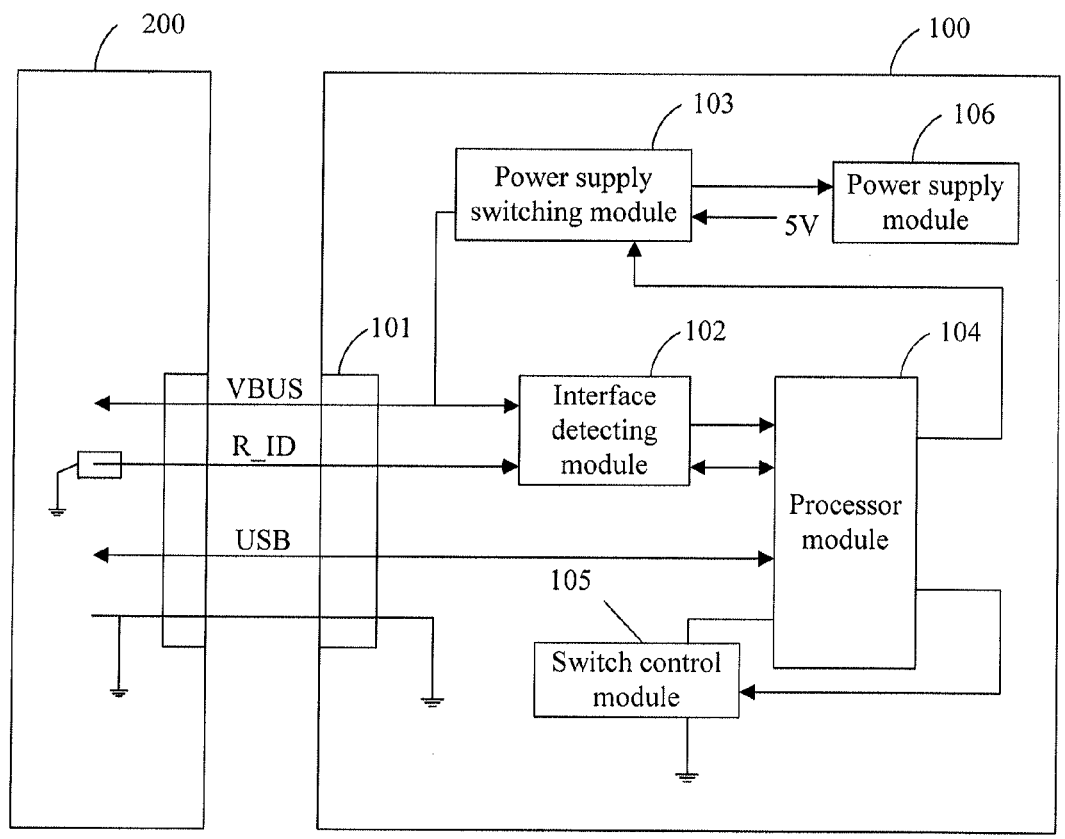
FIG. 2 is a structural block diagram of a terminal device with an OTG interface according to an embodiment of the present invention.

FIG. 2 is a schematic structural diagram of a terminal device according to an embodiment of the present invention. For ease of description, only a part related to the embodiment of the present invention is illustrated, and a detailed description is given below:

A terminal device 100 is provided. The terminal device 100 is connected to an accessory device 200, and the terminal device 100 includes:

a connector 101, configured to create a communication connection between the terminal device 100 and the accessory device 200, where the connector 101 includes a power line VBUS, a resistance detection line R_ID and a USB line;

in this embodiment, the terminal device 100 is connected to the accessory device 200 through the power line VBUS, the resistance detection line R_ID, and the USB line in the connector 101. The USB line is a USB OTG.

Connected to the connector 101 through the power line VBUS and the resistance detection line R_ID respectively, an interface detecting module 102 is configured to detect a mains voltage status of the power line VBUS and an ID resistance value of the accessory device 200. In this embodiment, the accessory device 200 may be treated as an external resistor. After the accessory device 200 is connected to the terminal device 100 through the connector 101, the interface detecting module 102 may detect a resistance value of the accessory device 200. In this embodiment, the detected resistance value is used as an identity value (ID value) of the accessory device 200, also called an ID resistance value.

Connected to the connector 101 through the power line VBUS, a power supply switching module 103 is configured to switch between using the terminal device 100 to power the accessory device 200 and using the accessory device 200 to power the terminal device 100.

Connected to the interface detecting module 102, the connector 101, and the power supply switching module 103 respectively, a processor module 104 is configured to identify a type of the accessory device 200 according to the ID resistance value of the accessory device 200 which is detected by the interface detecting module 102, where the processor module 104 is connected to the connector 101 through a USB OTG, and thereby connected to the accessory device 200 through the connector 101.

In this embodiment, the processor module 104 may identify the type of the accessory device 200 by querying a preset table of mapping between the ID resistance value of the accessory device and the type of the accessory device. In this embodiment, the type of the accessory device may include, without being limited to, an external keyboard, a VGA device, an HDMI device, an external USB device, a mobile phone, and a personal computer.

In this embodiment, the mapping table may be represented in the form of a configuration file. Examples may be given herein, but shall not limit the scope of the present invention. For example, if the ID resistance value of the accessory device is about 120K, the type of the accessory device may be an external keyboard; if the ID resistance value of the accessory device is about 150K, the type of the accessory device may be a VGA device; if the ID resistance value of the accessory device is about 620K, the type of the accessory device may be an HDMI device; and if the ID resistance value of the accessory device is about 300K, the type of the accessory device may be an external USB device. The ID resistance value may be changed as required in practice. For example, if the accessory device is a mobile phone or personal computer, the ID resistance value may be changed and then configured into a corresponding configuration file.

In this embodiment, the processor module 104 is further configured to: after the type of the accessory device 200 is identified, select a working mode of the processor module 104 according to the identified type of the accessory device 200. In this embodiment, the processor module 104 is connected to the connector 101 through the USB OTG, and thereby connected to the accessory device 200 through the connector 101. Therefore, the working mode of the processor module 104 may be a working mode of the USB OTG, where the working modes of the USB OTG include a Host mode and a Device mode. In this embodiment, a working mode corresponding to the type of the accessory device 200 in a preset working mode configuration file may be queried for according to the identified type of the accessory device 200, and the found working mode may be used as the working mode of the USB OTG.

In this embodiment, the type of the accessory device may include, without being limited to, an external keyboard, a VGA device, an HDMI device, an external USB device, a mobile phone, and a personal computer. Therefore, in the preset working mode configuration file, a working mode is available for each type of accessory device. For example, when the type of the accessory device is an external keyboard, or a VGA device, or an HDMI device, or an external USB device, the working mode of the USB OTG is a Host mode; when the type of the accessory device is a mobile phone or personal computer, the working mode of the USB OTG is a Device mode.

In this embodiment, upon selecting a working mode of the USB OTG, the processor module 104 sends a control signal of this working mode.

In this embodiment, the terminal device 100 further includes a switch control module 105, connected between the processor module 104 and the ground, and configured to control the USB OTG to automatically switch to a Host mode or a Device mode according to the control signal sent by the processor module 104.

In this embodiment, regardless of the working mode of the USB OTG, the processor module 104 is further configured to select a power supply mode of the terminal device according to the identified type of the accessory device 200 after the type of the accessory device 200 is identified. In this embodiment, selecting a power supply mode of the terminal device by the processor module 104 may be to select whether to use the terminal device 100 to power the accessory device 200 or to use the accessory device 200 to power the terminal device 100, where "the accessory device 200 supplies power to the terminal device 100" may also be understood as "the accessory device 200 charges the terminal device 100". In this embodiment, the power supply mode may be selected according to a power supply policy. The power supply policy may include, without being limited to: selecting a power supply mode by querying a preset power supply configuration file; or, applying a power supply mode of the accessory device currently set by the user; or, selecting a power supply mode according to the power output status of the accessory device.

In this embodiment, the power supply policy that selects a power supply mode by querying the preset power supply configuration file is described: Two configuration files may be configured for each type of accessory device, where the first configuration file serves a purpose of using the terminal device to power the accessory device, and, in this case, the processor module 104 controls the power supply switching module 103 to trigger the terminal device 100 to power the accessory device 200; and the second configuration file serves a purpose of using the accessory device to power the terminal device, and, in this case, the processor module 104 controls the power supply switching module 103 to trigger the accessory device 200 to power the terminal device 100. In this embodiment, the processor module 104 may select one configuration file in the accessory device randomly or preferentially as a current power supply policy to select a power supply mode, and determine whether the selected configuration file runs successfully; if the running succeeds, it indicates that it is appropriate to use the configuration file to select a power supply mode; if the running fails, the other configuration file in the accessory device is selected as a current power supply policy to select a power supply mode. For example, when the accessory device is an external keyboard, the power supply policy of the external keyboard may be: using the terminal device to power the external keyboard, or using the external keyboard to power the terminal device. In this embodiment, the external keyboard may be selected to be used to power the terminal device first; if the running fails, the terminal device is selected to be used to power the external keyboard.

In this embodiment, the power supply policy that applies a power supply mode of the accessory device currently set by the user is described: After identifying the type of the accessory device 200, the processor module 104 sends a message to prompt the user to set a power supply mode for the current accessory device. After the user finishes the setting, the processor module 104 supplies power according to the power supply mode of the accessory device currently set by the user. For example, when the accessory device is an external keyboard, the processor module 104 uses a display screen (not illustrated) to display the message to prompt the user to set a power supply mode for the external keyboard, and receives and executes the power supply mode set by the user.

In this embodiment, the power supply policy that selects a power supply mode according to a power output status of the accessory device is described: The interface detecting module 102 may detect whether the current accessory device outputs power, and notify a detection result to the processor module 104; and if detecting that the current accessory device does not output power, determine that the power output status of the current accessory device is zero output, and notify the processor module 104; or, if detecting that the current accessory device outputs power, determine that the power output status of the current accessory device is active output, and notify the processor module 104. For example, when the accessory device is an external keyboard, if detecting no power output from the external keyboard, the interface detecting module 102 notifies the processor module 104 that the external keyboard outputs no power, and therefore, the processor module 104 may select to use the terminal device 100 to power the accessory device 200.

The processor module 104 selects a power supply mode according to the power output status of the accessory device. If the power output status of the current accessory device is zero output, the processor module 104 selects to use the terminal device 100 to power the accessory device 200; or, if the power output status of the current accessory device is active output, the processor module 104 selects to use the accessory device 200 to power the terminal device 100.

In this embodiment, when selecting to use the terminal device to power the accessory device, the processor module 104 controls the power supply switching module 103 to trigger the terminal device 100 to power the accessory device 200; when selecting to use the accessory device to power the terminal device, the processor module 104 controls the power supply switching module 103 to trigger the accessory device 200 to power the terminal device 100.

With the technical solutions provided by the present invention, an ID resistance value of an accessory device is obtained and a type of the accessory device is identified; because a working mode of the USB OTG and a power supply mode of the terminal device are selected according to the identified type of the accessory device, the selection of the power supply mode of the terminal device is free from the restriction of working mode binding of the USB OTG, the impact caused by the binding between the power supply mode of the terminal device and the working mode of the USB OTG is reduced, and the application scope of the power supply for the terminal device is widened.

Figure 3:
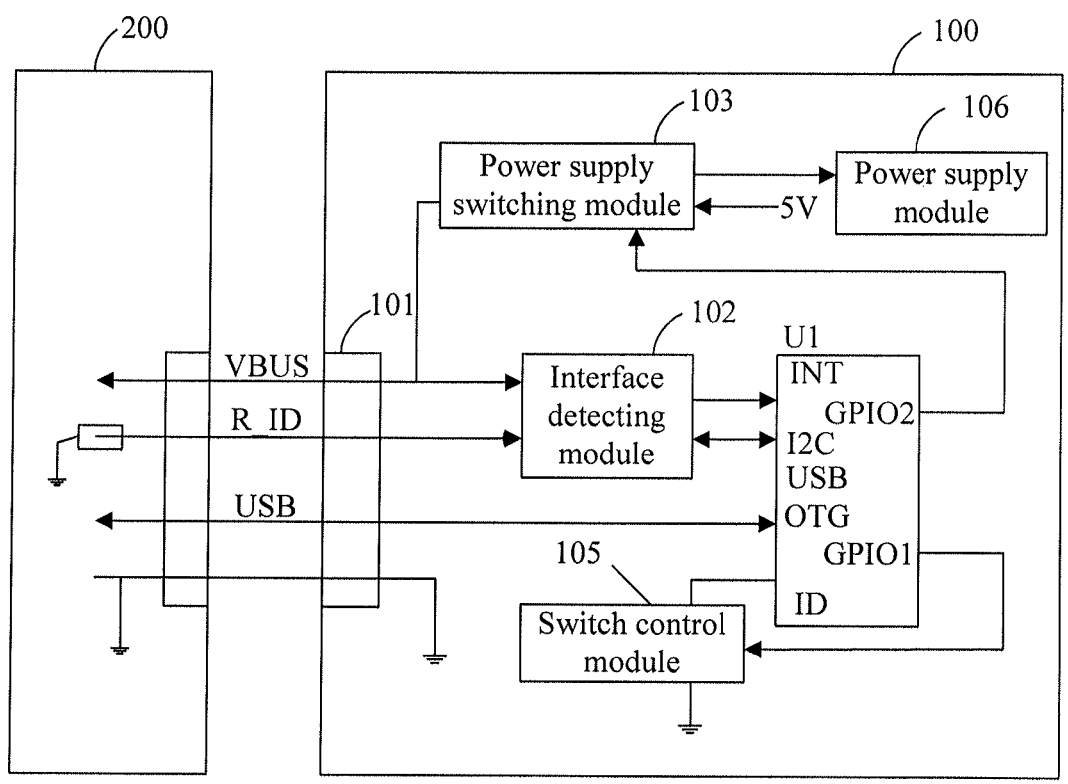
FIG. 3 is a circuit structural diagram of a terminal device with an OTG interface according to an embodiment of the present invention.

FIG. 3 shows a circuit structure of a terminal device according to an embodiment of the present invention. For ease of description, only a part related to the embodiment of the present invention is illustrated, and a detailed description is given below:

According to an embodiment of the present invention, the processor module 104 uses a control chip U1. An interrupt port INT and a signal port I2C of the control chip U1 are respectively connected to an interface detecting module 102; an OTG port USB OTG of the control chip U1 is connected to a connector 101 through a USB line; a peripheral identification port ID of the control chip U1 is connected to a switch control module 105; a first general input/output port GPIO1 of the control chip U1 is connected to a control port of the switch control module 105; and a second general input/output port GPIO2 of the control chip U1 is connected to a control port of a power supply switching module 103.

According to an embodiment of the present invention, the connector 101 is a Micro USB or Dock connector.

The terminal device with the OTG interface is implemented in the following way:

The control chip U1 is responsible for managing the terminal device 100, obtaining an ID resistance value of the accessory device 200 by communicating with the interface detecting module 102, and identifying a type of the accessory device 200 according to a preset table of mapping between the ID resistance value of the accessory device and the type of the accessory device.

When selecting a Host mode as a working mode of the USB OTG according to the identified type of the accessory device 200, the control chip U1 sends a control signal through the first general input/output port GPIO1 of the control chip U1 to trigger the connection of the switch control module 105; the peripheral identification port ID of the control chip U1 is grounded through the switch control module 105, and the USB OTG switches to the Host mode automatically; when selecting a Device mode as the working mode of the USB OTG according to the type of the accessory device 200, the control chip U1 controls the switch control module 105 to be disabled, and controls the peripheral identification port ID of the control chip U1 to be floating, and controls the USB OTG to be in the Device mode.

Meanwhile, the control chip U1 obtains the ID resistance value of the accessory device 200 by using the interface detecting module 102, and identifies the type of the accessory device 200 according to the preset table of mapping between the ID resistance value of the accessory device and the type of the accessory device.

When the power supply mode selected by the control chip U1 for the terminal device according to the identified type of the accessory device 200 is to use the accessory device 200 to power the terminal device 100, no matter whether the OTG interface is in a host mode or a Device mode, the second general input/output port GPIO2 of the control chip U1 sends a control signal that controls the power supply switching module 103 to use the power supply VBUS of the accessory device 200 as output of the power supply module 106 of the terminal device 200 to power the terminal device 100; when the power supply mode selected by the control chip U1 for the terminal device according to the identified type of the accessory device 200 is to use the terminal device 100 to power the accessory device 200, no matter whether the OTG interface is in a host mode or a Device mode, the second general input/output port GPIO2 of the control chip U1 sends a control signal that controls the power supply switching module 103 to switch from an internal 5 V power supply of the terminal device 100 to the power supply VBUS of the accessory device 200, thereby accomplishing the purpose of using the terminal device 100 to power the accessory device 200. The power supply module 106 supplies power to a battery and a system of the device itself. Moreover, the power supply module 106 may also be internally connected to a power supply interface between the terminal device 100 and an external 5 V power supply.

With the technical solutions provided by the present invention, an ID resistance value of an accessory device is obtained and a type of the accessory device is identified; because a working mode of the USB OTG and a power supply mode of the terminal device are selected according to the identified type of the accessory device, the selection of the power supply mode of the terminal device is free from the restriction of the working mode of the USB OTG, the impact caused by the binding between the power supply mode of the terminal device and the working mode of the USB OTG is reduced, and the application scope of the power supply for the terminal device is widened.

The foregoing descriptions are merely exemplary embodiments of the present invention, but are not intended to limit the present invention. Any modifications, equivalent substitutions, and improvements made within the spirit and principle of the present invention shall fall within the protection scope of the present invention.

What is claimed is:

1. A power supply method for a terminal device, wherein the terminal device is communicatively connected to an accessory device, and the method comprises:
   detecting, by the terminal device, an ID resistance value of the accessory device;
   identifying a type of the accessory device according to the detected ID resistance value;
   selecting a power supply mode of the terminal device according to the identified type of the accessory device, wherein the selecting of the power supply mode comprises:
   selecting one configuration file in the accessory device randomly without a preference, as a current Power supply Policy to select a power supply mode,
   determining whether the selected configuration file runs successfully;
   if the running Succeeds, using the selected configuration file as the current power supply policy to select a power supply mode otherwise
   if the running fails, selecting the other configuration file in the accessory device as the current power supply policy to select a Power supply mode; and
   supplying power according to the selected power supply mode.

2. The method according to claim 1, wherein the power supply mode of the terminal device comprises:
   using the terminal device to power the accessory device, or using the accessory device to power the terminal device.

3. The method according to claim 1, wherein the step of selecting a power supply mode of the terminal device according to the identified type of the accessory device comprises:
   selecting a power supply mode of the terminal device according to a power supply policy of the identified type of the accessory device.

4. The method according to claim 3, wherein the power supply policy comprises:
   selecting a power supply mode by querying a preset power supply configuration file corresponding to the type of the accessory device; or applying a power supply mode of the terminal device currently set by a user; or selecting a power supply mode according to a power output status of the accessory device.

5. The method according to claim 4, wherein:
   if the power supply policy is to select a power supply mode by querying the preset power supply configuration file corresponding to the type of the accessory device, the configuration file comprises two configuration files, that is, a configuration file for using the terminal device to power the accessory device, and a configuration file for using the accessory device to power the terminal device.

6. The method according to claim 4, wherein:
   if the power supply policy is to apply a power supply mode of the terminal device currently set by the user, the step of selecting a power supply mode of the terminal device according to a power supply policy of the identified type of the accessory device further comprises:
   using a message to prompt the user to set a current power supply mode for the terminal device so that the user sets the current power supply mode for the terminal device according to the identified type of the accessory device;
   receiving the current power supply mode set by the user; and
   using the current power supply mode set by the user as a current power supply policy to select a power supply mode.

7. The method according to claim 4, wherein:
   if the power supply policy is to select a power supply mode according to the power output status of the accessory device, the step of selecting a power supply mode of the terminal device according to a power supply policy of the identified type of the accessory device further comprises:
   detecting whether the current accessory device outputs power;
   determining, if it is detected that the current accessory device does not output power, the power output status of the current accessory device as zero output, and selecting to use the terminal device to power the accessory device; and
   determining, if it is detected that the current accessory device outputs power, the power output status of the current accessory device as active output, and selecting to use the accessory device to power the terminal device.

8. The method according to claim 1, further comprising:
   selecting a working mode of the terminal device according to the identified type of the accessory device while selecting the power supply mode of the terminal device according to the identified type of the accessory device.

9. The method according to claim 8, wherein:
   the working mode refers to a working mode of a USB OTG (Universal Serial BUS On-The-Go) of a processor of the terminal device, and the working mode comprises a Host mode and a Device mode.

10. The method according to claim 9, wherein the step of selecting a working mode of the terminal device according to the identified type of the accessory device comprises:
    querying for a working mode corresponding to the type of the accessory device in a preset working mode configuration file according to the identified type of the accessory device, and using the found working mode as the working mode of the USB OTG.

11. A terminal device, wherein the terminal device is communicatively connected to an accessory device and the terminal device comprises at least a processor which executes program codes stored in a memory to configure the terminal device to:
    detect an ID resistance value of the accessory device;
    identify a type of the accessory device according to the detected ID resistance value, and select a power supply mode of the terminal device according to the identified type of the accessory device, wherein the selecting of the power supply mode comprises the terminal device configured to:
select one configuration file in the accessory device randomly without a preference, as a current power supply policy to select a power Supply mode;
determine whether the selected configuration file runs successfully;
if the running succeeds, using the selected configuration file as the current power supply policy to select a power supply mode otherwise
if the running fails, selecting the other configuration file in the accessory device as the current power supply policy to select a power supply mode; and
switch a power supply of the terminal device according to the selected power supply mode.

12. The terminal device according to claim 11, wherein the power supply mode of the terminal device comprises:
using the terminal device to power the accessory device, or using the accessory device to power the terminal device.

13. The terminal device according to claim 11, wherein the terminal device is configured to:
to select a power supply mode of the terminal device according to a power supply policy of the identified type of the accessory device.

14. The terminal device according to claim 13, wherein:
the power supply policy comprises: selecting a power supply mode by querying a preset power supply configuration file corresponding to the type of the accessory device; or applying a power supply mode of the terminal device currently set by a user; or selecting a power supply mode according to a power output status of the accessory device.

15. The terminal device according to claim 14, wherein:
if the power supply policy is to select a power supply mode by querying the preset power supply configuration file corresponding to the type of the accessory device, the configuration file comprises two configuration files, that is, a configuration file for using the terminal device to power the accessory device, and a configuration file for using the accessory device to power the terminal device.

16. The terminal device according to claim 14, wherein:
if the power supply policy is to apply a power supply mode of the terminal device currently set by the user, the processor module is specifically configured to: use a message to prompt the user to set a current power supply mode for the terminal device so that the user sets the current power supply mode for the terminal device according to the identified type of the accessory device, receive the current power supply mode set by the user, and use the current power supply mode set by the user as a current power supply policy to select a power supply mode.

17. The terminal device according to claim 14, wherein:
when the power supply policy is to select a power supply mode according to the power output status of the accessory device, the terminal device is further configured to:
detect whether the current accessory device outputs power; and
determine, if the interface detecting module detects that the current accessory device does not output power, the power output status of the current accessory device as zero output, and select to use the terminal device to power the accessory device; or
determine, if the current accessory device outputs power, the power output status of the current accessory device as active output, and select to use the accessory device to power the terminal device.

18. The terminal device according to claim 11, wherein the terminal device is further configured to:
select a working mode of the terminal device according to the identified type of the accessory device while selecting the power supply mode of the terminal device according to the identified type of the accessory device.

19. The terminal device according to claim 18, wherein:
the working mode refers to a working mode of a USB OTG (Universal Serial BUS On-The-Go) of a processor of the terminal device, and the working mode comprises a Host mode and a Device mode.

20. The terminal device according to claim 19, wherein the terminal device is further configured to:
query for a working mode corresponding to the type of the accessory device in a preset working mode configuration file according to the identified type of the accessory device, and use the found working mode as the working mode of the USB OTG.

* * * * *